US011374979B2

(12) United States Patent
Mercian et al.

(10) Patent No.: US 11,374,979 B2
(45) Date of Patent: Jun. 28, 2022

(54) GRAPH-BASED POLICY REPRESENTATION SYSTEM FOR MANAGING NETWORK DEVICES

(71) Applicant: Hewlett Packard Enterprise Development LP, Houston, TX (US)

(72) Inventors: Anu Mercian, Santa Clara, CA (US); Puneet Sharma, Palo Alto, CA (US); Charles F. Clark, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 224 days.

(21) Appl. No.: 16/452,152

(22) Filed: Jun. 25, 2019

(65) Prior Publication Data
US 2020/0412763 A1 Dec. 31, 2020

(51) Int. Cl.
*H04L 9/40* (2022.01)
*H04L 41/0803* (2022.01)

(52) U.S. Cl.
CPC .......... *H04L 63/20* (2013.01); *H04L 41/0803* (2013.01); *H04L 63/101* (2013.01)

(58) Field of Classification Search
CPC ... H04L 63/20; H04L 63/101; H04L 41/0803; H04L 41/085; H04L 41/0895; H04L 47/20; H04L 47/2486; G06F 21/577
USPC .......................................................... 726/1
See application file for complete search history.

(56) References Cited

U.S. PATENT DOCUMENTS 8,693,344 B1 4/2014 Adams et al.
2018/0139096 A1\* 5/2018 Lee ..................... H04L 41/0893

OTHER PUBLICATIONS

Prakash et al., "PGA: Using Graphs to Express and Automatically Reconcile Network Policies", SIGCOMM '15, ACM, Aug. 17-21, 2015, 14 pages.
Amin, R. et al., Auto-configuration of ACL Policy in Case of Topology Change in Hybrid SDN, (Research Paper), Dec. 19, 2016, 14 Pgs.
Kazemian, P. et al., Real Time Network Policy Checking using Header Space Analysis, (Research Paper), Retrieved Dec. 20, 2018, 13 Pgs.
Pantuza, G. et al., Network Management through Graphs in Software Defined Networks, (Research Paper), Retrieved Dec. 20, 2018, 6 Pgs.
Tran, T. et al., PolicyVis: Firewall Security Policy Visualization and Inspection, (Research Paper), 21st Large Installation System Administration Conference (LISA '07), Retrieve Dec. 20, 2018, 16 Pgs.

\* cited by examiner

*Primary Examiner* — Glenford J Madamba
(74) *Attorney, Agent, or Firm* — Sheppard Mullin Richter & Hampton LLP

(57) ABSTRACT

Systems and methods are provided for managing network devices using policy graph representations. In some embodiments, the method includes receiving configurations for a plurality of network devices; extracting one or more policies from the configurations; extracting a label hierarchy from the configurations, the label hierarchy describing an organization of nodes in a network comprising the network devices; generating a connectivity of a network comprising the network devices based on the one or more policies and the label hierarchy; generating a policy graph representation of the connectivity of the network; and displaying the policy graph representation of the connectivity to a user.

18 Claims, 14 Drawing Sheets

400

| | |
|---|---|
| 6 | no shutdown |
| 7 | access-list ip *GCS-Block* |
| 8 | *100 permit any any any* |
| 9 | *30 permit icmp any any* |
| 10 | *35 deny udp any 16.93.240.248* |
| 11 | *40 deny udp any 16.93.240.249* |
| 12 | *45 deny udp any 16.93.241.5* |
| 13 | *50 deny udp any 16.93.246.227* |
| 14 | *55 deny udp any 16.93.246.228* |
| 15 | *60 deny udp any 16.93.246.229* |
| 16 | *65 deny udp any 16.93.246.236* |
| 17 | *70 deny udp any 16.93.246.237* |
| 18 | *75 deny udp any 16.93.246.238* |
| 19 | *80 deny udp any 16.93.246.239* |
| 20 | *85 deny udp any 16.93.246.240* |
| 21 | *90 deny udp any 16.93.246.241* |
| 22 | *95 deny udp any 16.93.246.80* |
| 23 | *10 comment Appled* |
| 24 | *15 comment Author:* |
| 25 | *20 comment -* |
| 26 | *25 comment HP-UX* |
| 27 | access-list *ip Lab3-DHCP-Filter* |
| 28 | *40 permit any any any* |
| 29 | *30 deny udp any any range 67 68* |
| 30 | interface *1/1/4* |
| 31 | description *Downlink to R5L-Lab3-Row6-Core-1(H8)* |
| 32 | no shutdown |
| 33 | no routing |

FIG. 4

List of Intents 600

| Enabled | Name | N# edges | N# nodes |
|---------|------|----------|----------|
| ✓ | Lab3-DHCP-Filter2 | 1 | 2 |
| ✓ | Lab3-DHCP-Filter1 | 1 | 2 |
| ✓ | GCS-Block9 | 1 | 2 |
| ✓ | GCS-Block8 | 1 | 2 |
| ✓ | GCS-Block7 | 1 | 2 |
| ✓ | GCS-Block6 | 1 | 2 |
| ✓ | GCS-Block5 | 1 | 2 |
| ✓ | GCS-Block4 | 1 | 2 |
| ✓ | GCS-Block3 | 1 | 2 |
| ✓ | GCS-Block2 | 1 | 2 |
| ✓ | GCS-Block1 | 1 | 2 |

FIG. 6

| Policy Name | Label subnet | Metadata |
|---|---|---|
| GCSBlock | GCSBlock1, ... | Policy name, type |
| DHCPFilter | DHCPFilter, ... | Policy name, type, class |

FIG. 12

| Subnet Name | Label subnet | Metadata |
|---|---|---|
| Hpe-guest | Hpe-guest, ... | SSID based, created_at, updated_at, deleted_at |
| Marketing | Marketing1 | created_at, updated_a |

FIG. 13

GRAPH-BASED POLICY REPRESENTATION SYSTEM FOR MANAGING NETWORK DEVICES

DESCRIPTION OF RELATED ART

The disclosed technology relates generally to data communication networks, and more particularly some embodiments relate to managing network devices in such networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 shows a portion of an example configuration of a network device.

FIG. 6 illustrates a list of intents for the current example.

FIG. 12 illustrates example labels based on policy name.

FIG. 13 illustrates example labels based on existing active database metadata classification.

Figure 1:
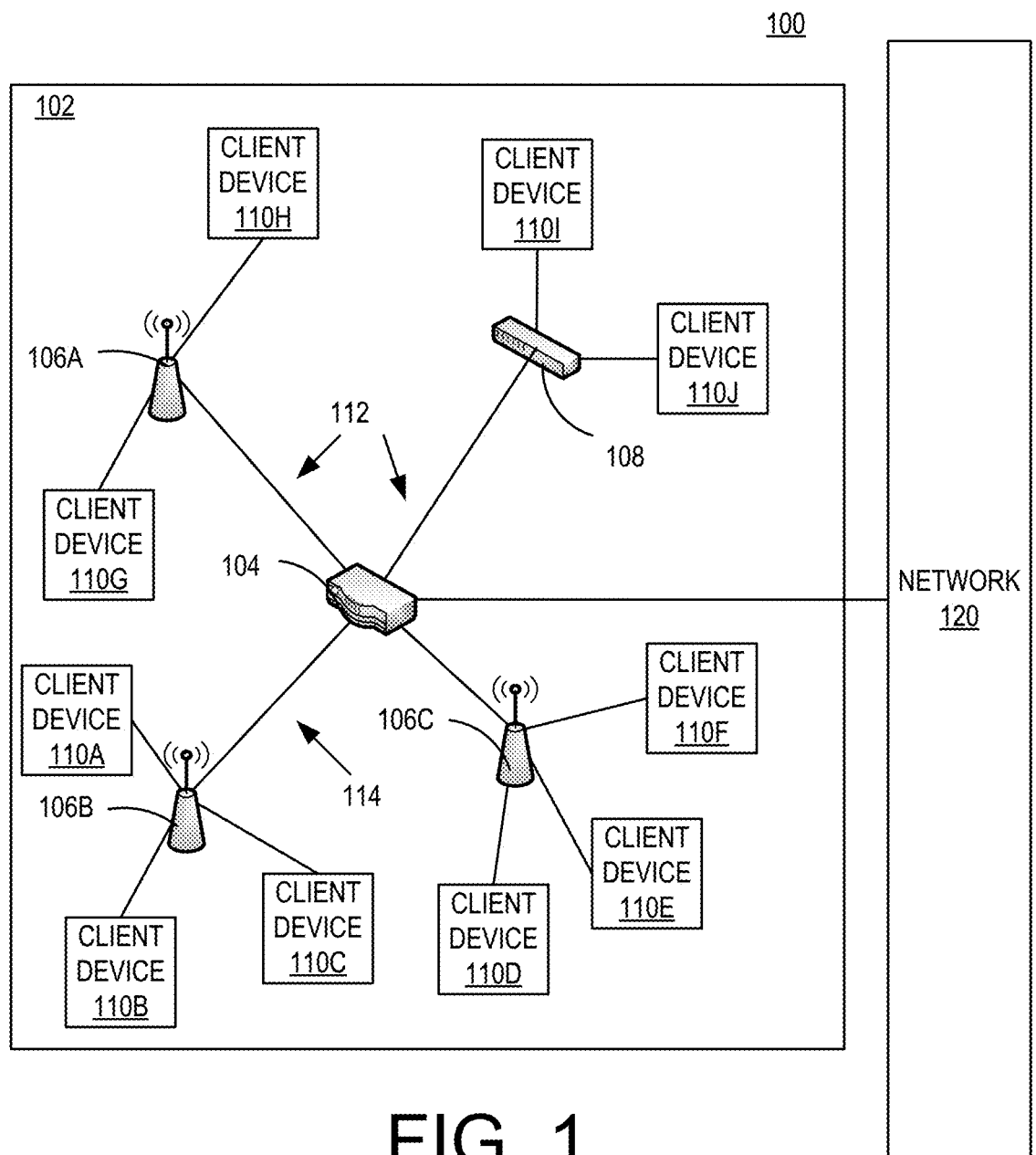
FIG. 1 illustrates one example of a network that may be implemented for an organization, such as a business, educational institution, governmental entity, healthcare facility or other organization.

The figures are not exhaustive and do not limit the present disclosure to the precise form disclosed.

DETAILED DESCRIPTION

A network device, for example such as a switch, a firewall, or the like, operates according to policies specified by a configuration. For example, for a network switch, the configuration is a text file containing the various commands and protocols configured in the network switch, which is generally edited using a command line interface. As network devices and their policies become more complex, so do the configurations. But when such complex configurations are presented in command line interface format, they are difficult for users to understand. The complexity is further increased as the intents and policy are network wide depending on multitude of configurations from all the devices in the network.

Embodiments of the disclosed technology provide a graph-based policy representation system tool that automatically generates policy graph representations of policies such as access control lists, firewalls, network function behaviors etc. from configurations. The policy graph representations may represent the connectivity and other policies of the network, the network policies, and may include hierarchical input graphs created from labels. The policy graph representations may be based on a label hierarchy extracted from combination of the configurations. The policy graph representations may be generated based on intents of the policies, as expressions of those intents. These network policy graph representations are for network wide intents and policies.

According to some embodiments, the user may change the policies by manipulating the policy graph representations. The policy graph representations may be modified based on various intelligent policy analysis and resolutions such as conflict resolution, label resolution, end point group combination etc. A new set of configurations for one of more network devices may be generated based on the modified policy graph representations. The configurations may be installed in respective network devices.

The policy graph representations may take many forms. Based on the policy type, the policy graph may represent a specific format, and can be associated to a particular domain and/or deployment. For example, policies such as ACL (Access Control List) may have the form of source IP, destination IP, protocol type and ALLOW/DENY. If policies are Firewall, then the format may be source, destination, application. The source destination tuple may be IP addresses, MAC addresses etc. External third-party tools to generate the Service graph or Policy may also be used to represent the policy [reference PGA patent?]. The disclosed technology may be hosted in an on-premises server or in cloud solution that can access all of the network devices in the network. The disclosed technology representations may work with any network application/API that can access all the network device configurations and extract policies from the network devices. The disclosed technology may work with any model of the configuration, including white-list, black-list, and grey-list. The disclosed technology may extract policies from all types of network devices. The disclosed technology may synchronize with the current running-config of the network devices, so when there is an update on the configurations, the policy graph representations will be updated. The disclosed technology may monitor for configuration changes, and may responds to update the policy graph representations. Notification may be poll based, subscription based, or the like. The disclosed technology may have a built-in API or work with APIs that give access to network device configurations.

Before describing embodiments of the disclosed systems and methods in detail, it is useful to describe an example network installation with which these systems and methods might be implemented in various applications. FIG. 1 illustrates one example of a network 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site (on-premises location) 102 in communication with a network 120. The network configuration 100 may also include one or more remote sites (off-premises locations) 132, 142, that are in communication with the network 120.

The primary site 102 may include a primary network (not shown), which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Figure 2:
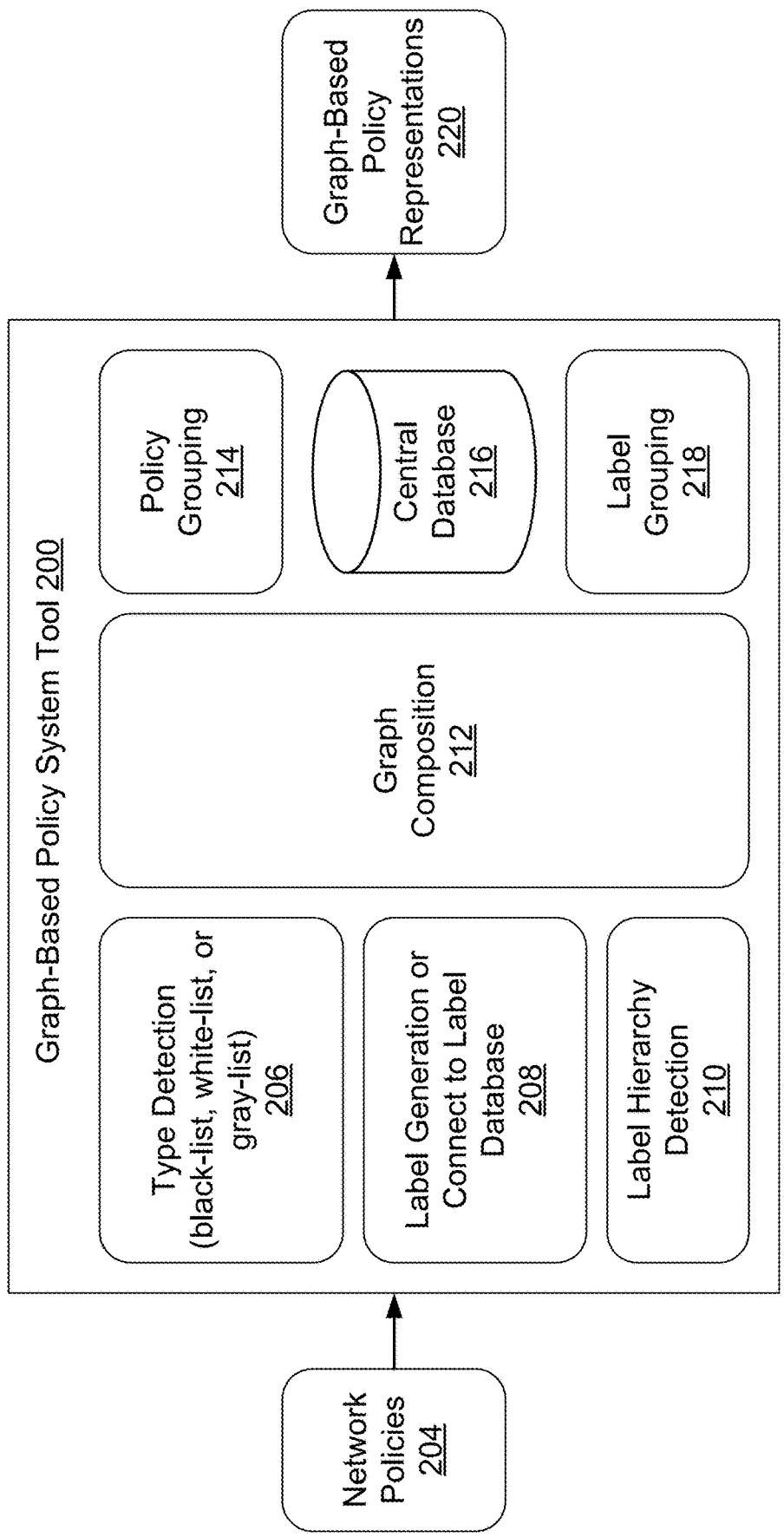
FIG. 2 illustrates an architecture of the disclosed graph-based policy system tool according to embodiments of the disclosed technology.

FIG. 2 illustrates an architecture of the disclosed graph-based policy system tool 200 according to embodiments of the disclosed technology. The tool 200 operates upon network policies 204, which may be embodied in a device configuration. The tool 200 performs type detection, at 206. In particular, the tool 200 determines whether the policy is based on a black-list model, a white-list model, or a gray-list model. The tool 200 extracts labels for the network policies 204, at 208. These labels may be extracted from the policies 204, or obtained from a label database. Based on the labels, the tool 200 detects a label hierarchy, at 210. The label hierarchy is stored in the central database 216, at 218. With the labels, and the label hierarchy, the tool 200 performs policy grouping, at 214. Using this information, the tool performs graph composition to generate graph-based policy representations 220, at 212. These representations 220 may be stored in a central database 216, and may be displayed to a user to enable the user to more easily understand the policies, and to modify the policies using the representations. These features are described in greater detail below.

Figure 3A:
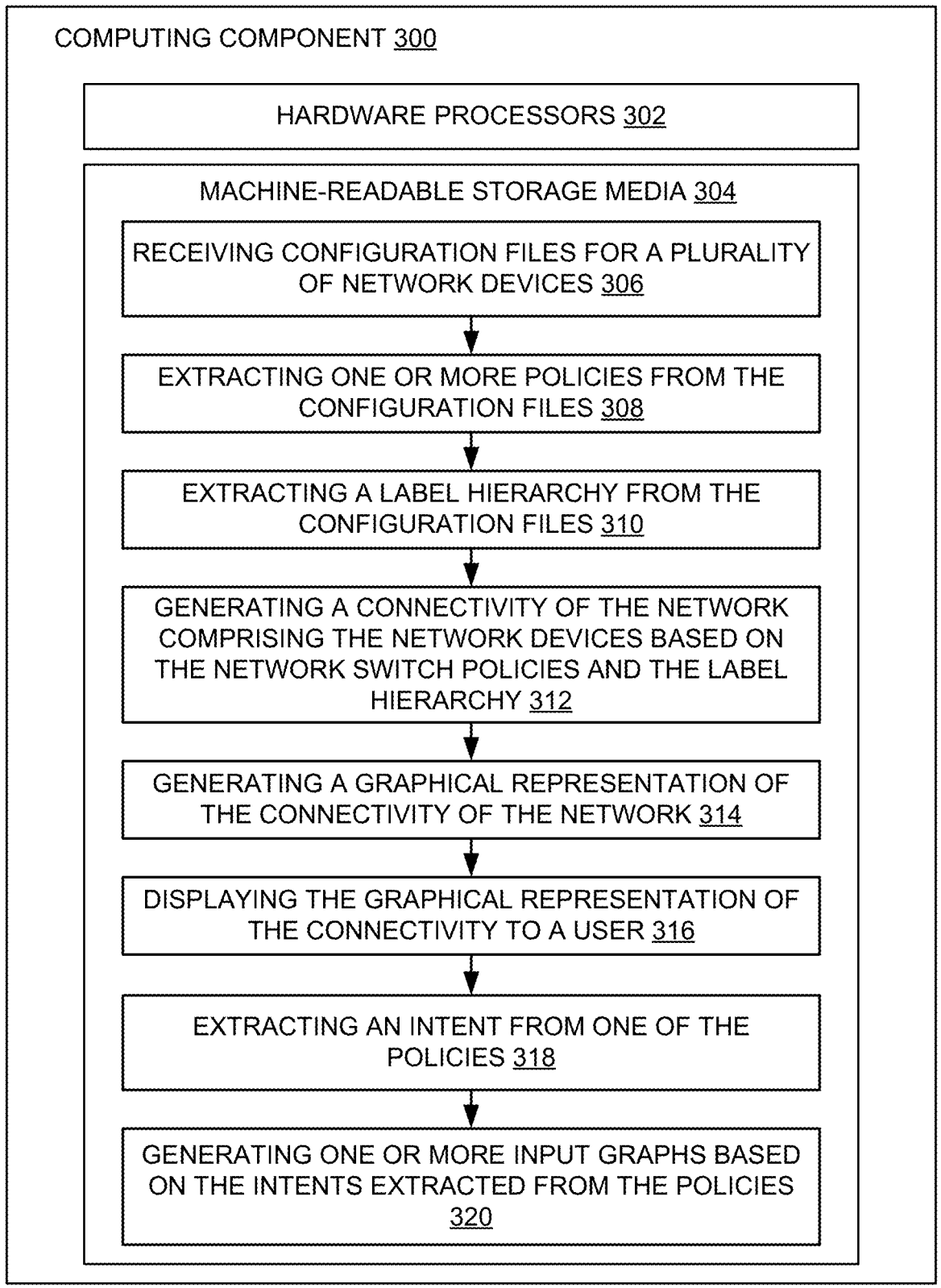
FIGS. 3A, 3B are a block diagram of an example computing component or device for managing a network device using policy graph representations in accordance with one embodiment.
Figure 3B:
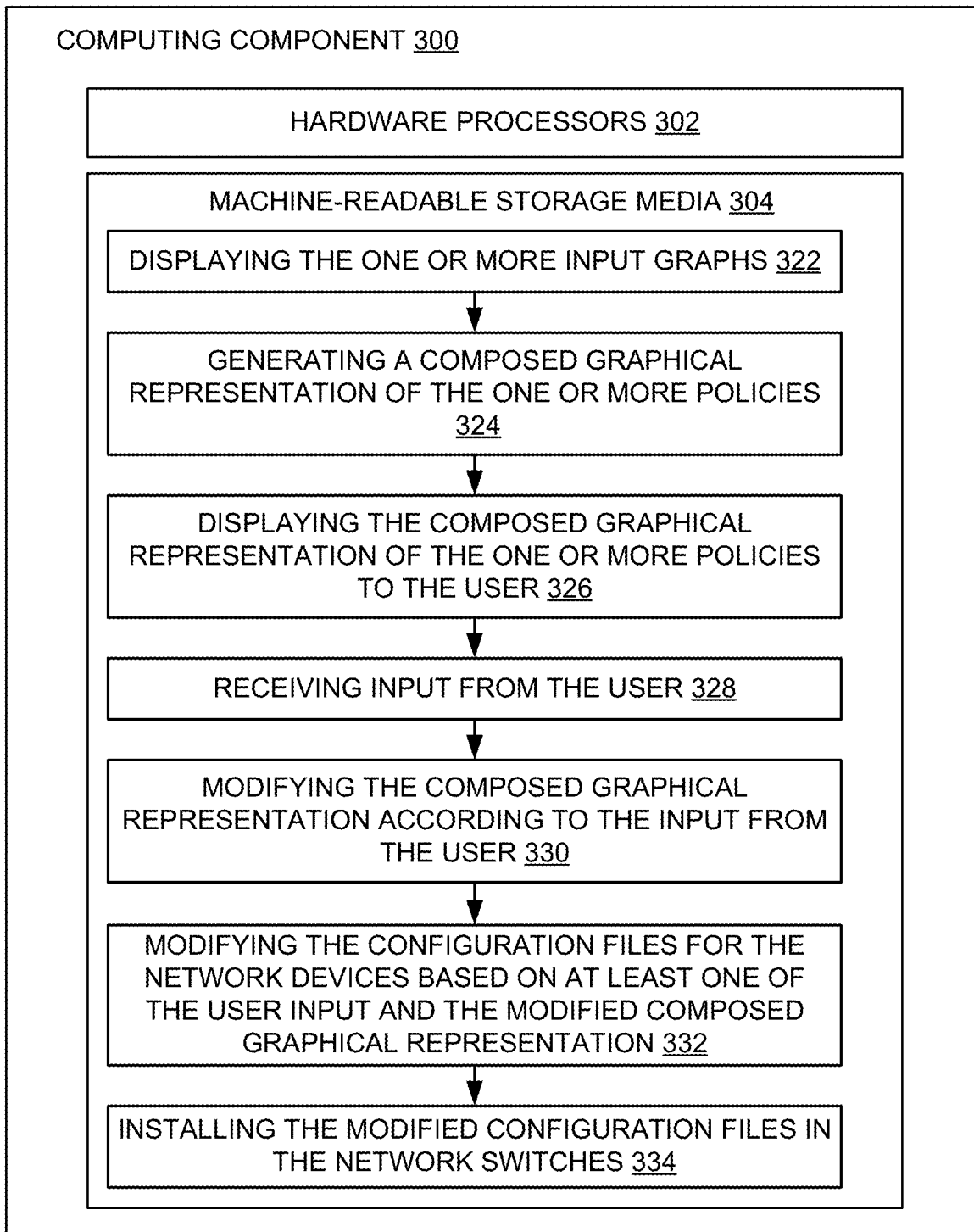

FIGS. 3A,B are a block diagram of an example computing component or device 300 for managing a network switch 108 using policy graph representations in accordance with one embodiment. Although various embodiments may be described with reference to network switches, it should be understood that the disclosed technology applies to other network devices, including firewalls and the like. Computing component 300 may be, for example, a server computer, a controller, or any other similar computing component capable of processing data. In the example implementation of FIG. 3, the computing component 300 includes a hardware processor 302, and machine-readable storage medium 304. In some embodiments, computing component 300 may be an embodiment of the controller 104 of FIG. 1. Computing component 300 may be hosted either on-premises or in a cloud server.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-312, to control processes or operations for managing network switches using policy graph representations. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-312.

Hardware processor 302 may execute instruction 306 to perform receiving configurations for a plurality of network devices 108. FIG. 4 shows a portion of an example configuration 400. As can be seen in FIG. 4, the configuration 400 represents multiple policies, including two access control lists. Embodiments of the disclosed technology will be described with reference to access control lists. However, it will be understood that the disclosed technology applies to any network switch policies. Some embodiments include detecting a model type for the configuration for the network switch. For an access control list, the model type may be blacklist, where access between two groups of network devices based on a particular match is denied by default, or whitelist, where access is permitted by default. Such embodiments, responsive to the detected model type being a blacklist model, convert the configurations to a whitelist model prior to extracting policies and/or a label hierarchy from the configurations.

Hardware processor 302 may execute instruction 308 to perform extracting one or more policies from the configurations. With the received configuration files 306 from various network devices, the policies are identified and extractedReferring to FIG. 4, the configuration file 400 may be part of a large configuration file, and shows only 2 ACL policies. each policy has a name or label, for example, "GCS-Block" and "Lab3-DHCP-Filter". The labels are extracted to create the label hierarchy, as explained below, which will form the labels of the graph edge nodes. The policies from line 8 to line 22 in FIG. 4 may then be extracted to match the format tuple such as (ALLOW/

DENY, PROTOCOL, SOURCE, DESTINATION). This format tuple may vary with respect to the machine, product, company selling the product etc. Protocols labeled "ANY" refer to all the available protocols associated to the type of network switch or router, for example such as the protocols shown in FIGS. 5, 7, and 8. It should be noted that the label "ANY" may occur in multiple policies across multiple network devices. In this example, the label "ANY" may be considered as one node, with multiple policies connecting to it. But the label "ANY" may also refer to multiple sub labels of "ANY" if differentiation per device is required.

Hardware processor 302 may execute instruction 310 to perform extracting a label hierarchy from the configurations, the label hierarchy describing an organization of nodes in the network comprising the network devices. The label hierarchy is stored in the central database 216 of FIG. 2. In some embodiments, the label hierarchy is extracted based on Internet protocol (IP) subnets. Extracting the label hierarchy based on IP subnets may follow the class A, B, C convention. Labels may be extracted from the policy names such as "GCS-Block" and "Lab3-DHCP-Filter" in the example of FIG. 4. Labels may also be extracted from IP addresses, MAC addresses, port numbers, label specific databases like Active Directory, and the like. Labels may be unique in one graph compilation. For example, if policies from 100 switches with 500 policies are gathered by the tool, the overall graph that is generated includes unique labels to identify each policy, including source and destination. A label hierarchy may be established by $3^{rd}$ party tools, or may be generated within the tool. Labels may form either a hierarchical tree format, or a distributed format mimicking the topology of the network deployment. For example, consider a department in an enterprise company such as Marketing with hundreds of network devices. Then the hierarchy may include a root node "Marketing," with each device within the Marketing department having an additive to the root node. Similarly, if the devices in the Marketing department form a P2P network or LAN network, then a similar topology based hierarchy may be given to the labels. This label hierarchy provides the user with an easy way to create new policies, and provides an understanding of the various policies in a structured manner.

Labels can be formed from various sources, which is helpful when creating graphical representation from existing policies. In one example, referred to herein as "policy name based labeling," labels can be provided to the various devices in a policy based on the existing policy name. In another example, referred to herein as "subnet space aggregation based labeling," an end-point group may be labeled based on subnet information and IP addresses. These can be labels such as "Marketing," indicating devices in the Marketing department, a random string of variables, and the like. Another example, referred to herein as "classification type based labeling," is useful with wireless devices that connect to a provided SSID, and cannot be statically part of a single edge group. In this case, labels may be based on SSIDs so that when a device joins the network, it is given a label that may be destroyed and reused later. Proper labeling is very helpful for graph based representations because, if a network administrator is using the tool to improve cognitive recognition of policies, the label names must be relevant. Proper labeling is also helpful in policy grouping. Label reusability should also be considered where metadata tags such as "created_at," "updated_at," and "deleted_at" should be stored in the database.

FIG. 13 illustrates example labels based on policy name. Referring to FIG. 13, the policy names extracted from the configuration are "GCSBlock" and "HCPFilter." The label subnets are listed as well, beginning with "GCSBlock1" and "DHCPFilter," respectively. The metadata is listed as well, and may include the policy name, type, and class.

Figure 14:
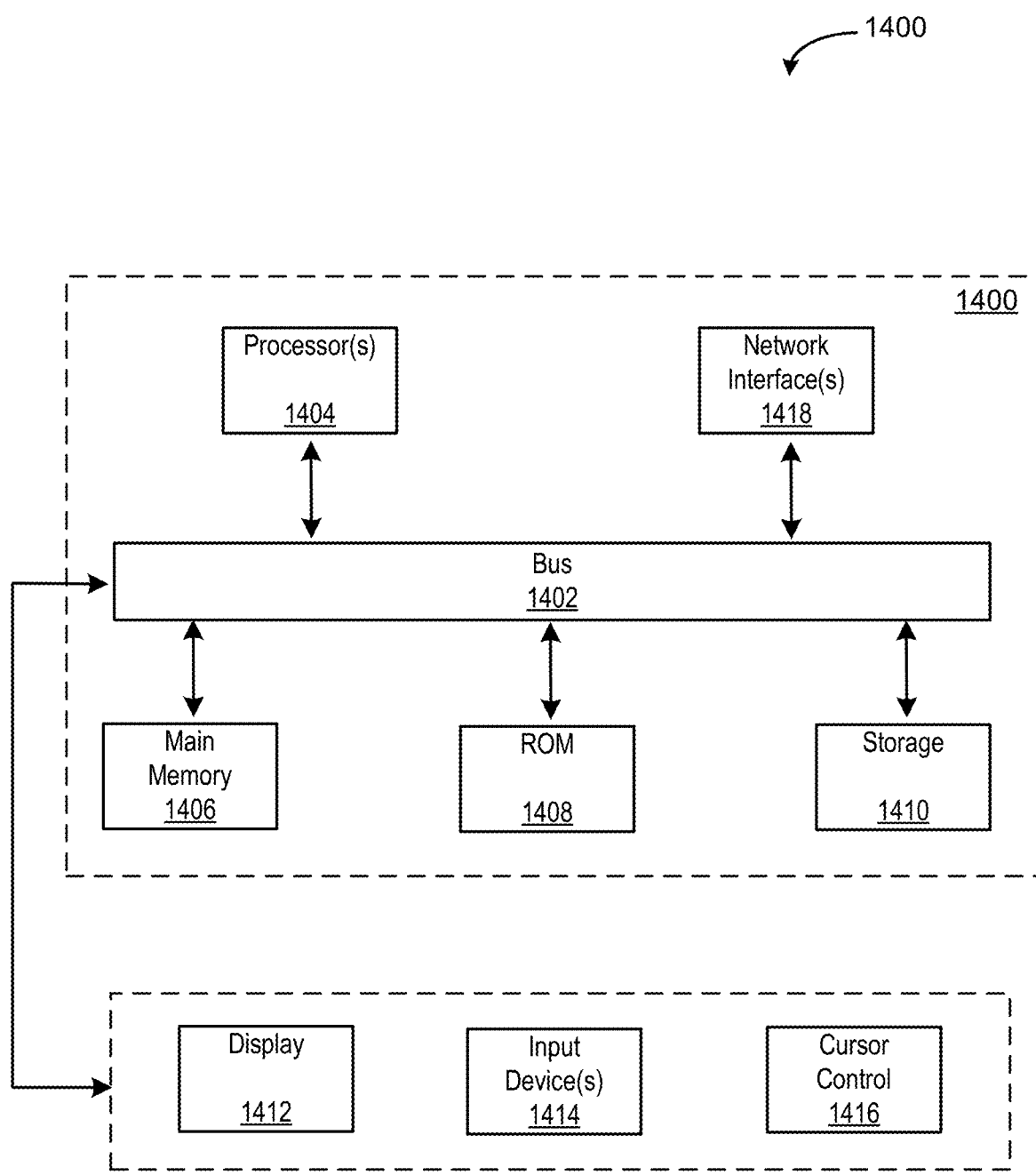
FIG. 14 depicts a block diagram of an example computer system in which embodiments described herein may be implemented.

FIG. 14 illustrates example labels based on existing active database metadata classification. Referring to FIG. 14, the subnet names are listed as "Hpe-guest" and "Marketing." The label subnets are listed as well, beginning with "Hpe-guest1" and "Marketing1." The metadata tags are listed, and as described above, may include metadata tags such as "SSID based," "created_at," "updated_at," and "deleted_at."

In some embodiments, the label hierarchy is extracted based on the label naming convention used in the configurations. The label naming convention may be established by a domain, customer, or the like. For example, every network deployment will have a root node that combines all the access control lists in the network. The root node is the main label extracted from the CLI configuration and subset device IP addresses, and groups may be identified based on the numerology suffixed to it. In the described example, the root node is named Department. Referring again to FIG. 4, other labels may be extracted according to the names of the access control lists. In this example, those names are GCS-Block and Lab3-DHCP-Filter. Label information may be inferred from other information and sources. For example, label information may be inferred from information such as IP address, subnet, and the like. Label information may be inferred from other sources. For example, label information may be inferred from sources such as active directory, DNS repositories, and the like.

Figure 7:
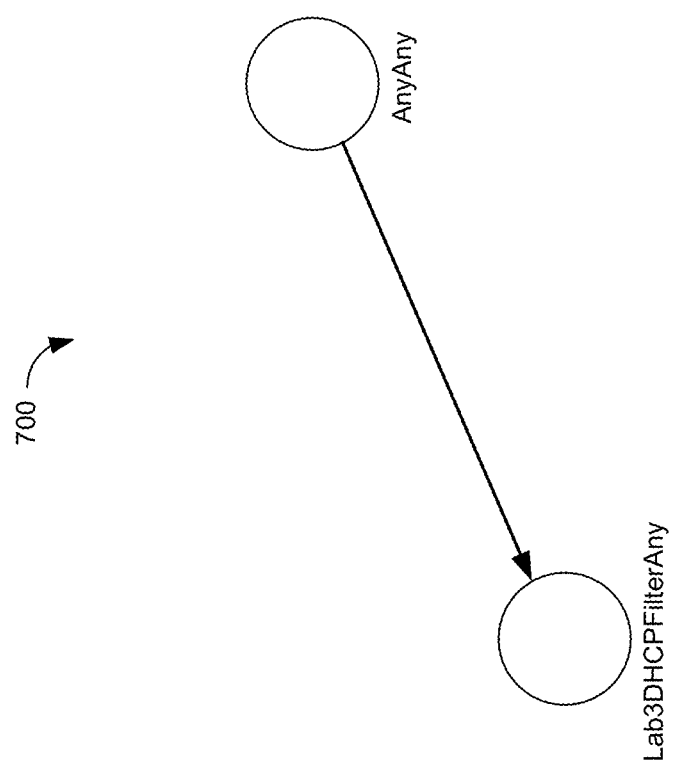
FIG. 7 illustrates an input graph for visualizing one of the intents in the list of FIG. 6.
Figure 8:
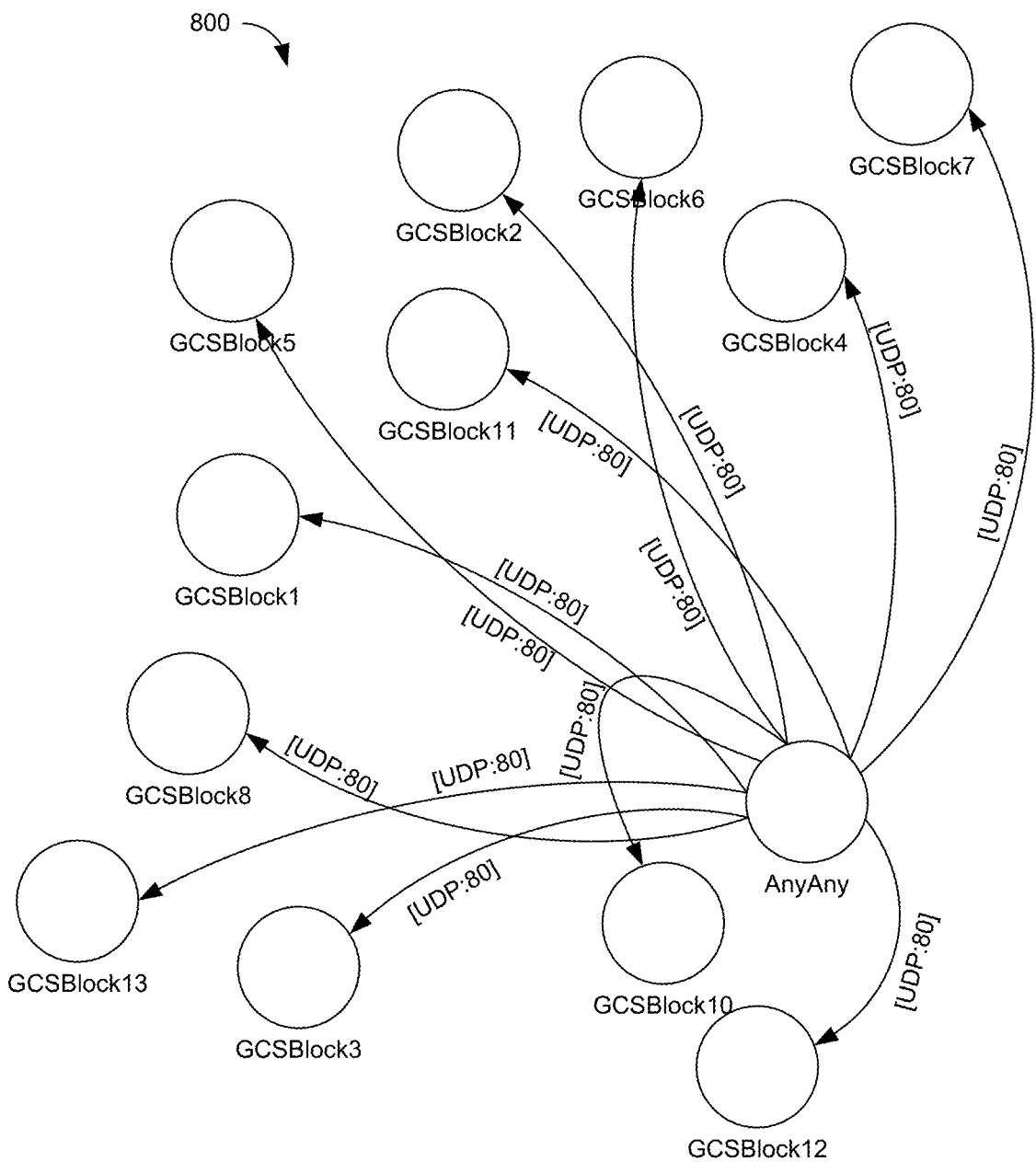
FIG. 8 illustrates a composed policy graph representation of the access control list, for example GCS-Block, which is semantic label given to an end-point or an end-point group of network devices or devices connected to the network.
Figure 9:
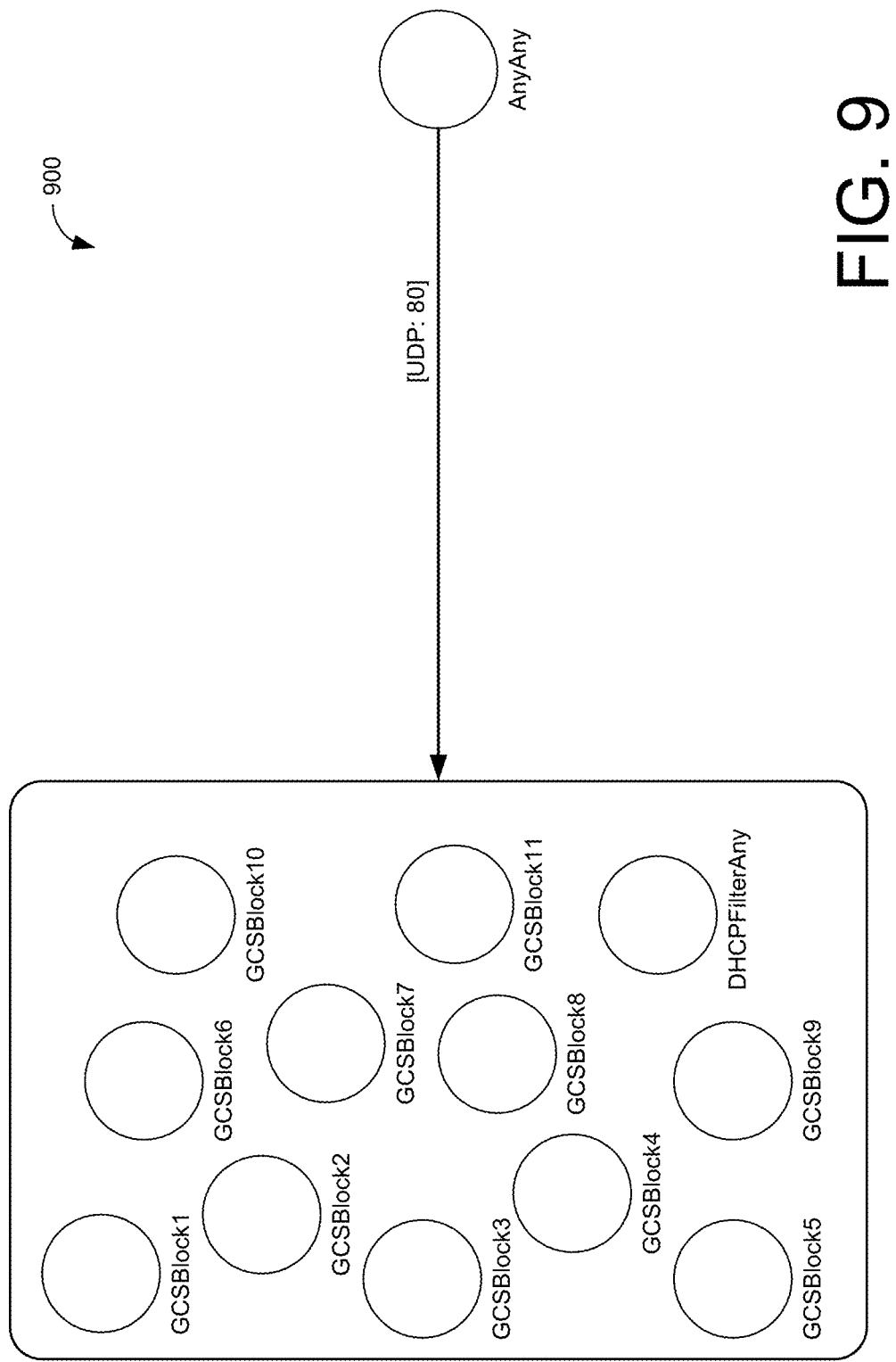
FIG. 9 illustrates a policy grouping for the example composed graph of FIG. 8.

Hardware processor 302 may execute instruction 312 to perform generating a connectivity of the network comprising the network devices based on the network switch policies and the label hierarchy. Hardware processor 302 may execute instruction 314 to perform generating a policy graph representation of the connectivity of the network. A policy graph generation may be described as having three steps. First, the policies are converted into input graphs where the source is one node, the destination is the other node, and the edge is the connectivity policy. An example input graph 700 is shown in FIG. 7 for the example configuration 400 of FIG. 4. A large configuration file may have a large number of input policies. A unique label is given to each input policy as a way to back-track the policy from the composed graph representation. Next, multiple input graphs are composed into one large composed graph. An example composed graph 800 is shown in FIG. 8. Policies may be composed in many ways, and may leverage tools such as a policy graph abstraction (PGA), [reference PGA patent] which combines them based on different labels to resolve any conflicts between policies. The final step is policy grouping, which groups the policies based on similar edges. FIG. 9 illustrates a policy grouping 900 for the example composed graph 800 of FIG. 8. This step creates a group of source nodes and another group of destination nodes with similar policy such as "ALLOW UDP". When users are looking into thousands of policies, seeing a composed graph of unique source/destination nodes and various policies between them may be tedious. Grouping the policies in a graph based view reduces cognitive overhead for the user. The user may also use the policy group view to retrieve the larger detailed composed graph. Policy grouping may be unique for each topology path connectivity.

Figure 5:
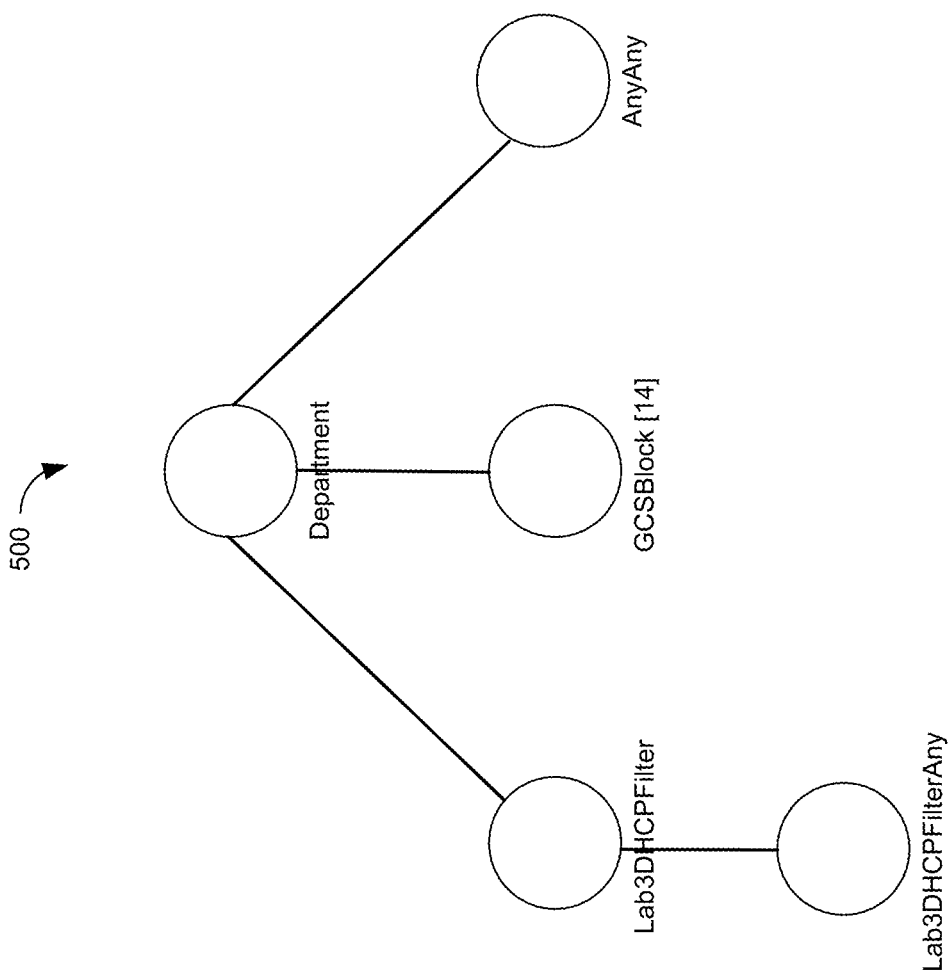
FIG. 5 illustrates a policy graph representation of policy inferred from the configuration of FIG. 4.

Hardware processor 302 may execute instruction 316 to perform displaying the policy graph representation of the connectivity to a user. FIG. 5 illustrates a policy graph representation 500 of a connectivity for the configuration 400 of FIG. 4. Referring to FIG. 5, the root node Department appears at the top of the representation 500. Connected to the root node Department are the access control lists GCS-Block and Lab3-DHCP-Filter, and the policy AnyAny. Where GCS-Block and Lab3-DHCP-Filter are labels given to various departments in a sample switch configuration deployment, AnyAny is a policy comprising of all policies supported by the switch. In the representation 500, it can be seen that the access control list GCS-Block includes 14 entries. Connected to the access control list Lab3-DHCP-Filter is the policy Lab3-DHCP-FilterAny.

The representation 500 of FIG. 5 depicts a simple network connectivity. However, it should be understood that for complex network topologies, a policy graph representation will be more easily understood by user than a command line interface configuration. With such policy graph representations, users will be able to more easily understand network configurations, and will be able to modify those configurations more rapidly and accurately.

Hardware processor 302 may execute instruction 318 to perform extracting the connectivity intent from the policies. For an access control list, the intent may indicate whether the switch by default uses a white-list model where all the policies by default allow traffic from any source to any destination, or a black-list model where all the policies by default deny traffic and it is required to explicitly mention which traffic will be allowed. In the described example, a white-list model is used. For example, access control list policies having a rule "any any any allow" allow all traffic from any source to any destination with any protocol. FIG. 6 illustrates a list 600 of intents for the current example. For each intent, the list 600 specifies whether the intent is enabled, the number of edges of the intent, and the number of nodes of the intent.

Hardware processor 302 may execute instruction 320 to perform generating one or more input graphs based on the intents extracted from the policies. Hardware processor 302 may execute instruction 322 to perform displaying the one or more input graphs. FIG. 7 illustrates an input graph 700 for visualizing one of the intents in the list 600 of FIG. 6. The input graph 700 depicts the policy AnyAny as an input to the policy Lab3-DHCP-FilterAny.

Hardware processor 302 may execute instruction 324 to perform generating a composed graph representation of the one or more policies. Composed graphs may be generated by combining the same source and destination based on a classification rule such as IP address, MAC address, edge groups, ports, or subnets. As shown in FIG. 8, the tool labels the various devices or virtual machines within a subnet with related labels based on the policy label name. Abd because all the policies have the same source "ANY", the tool combines them as one node. Each edge identifies the policy rule. In the example of FIG. 8, there is only one policy rule of allowing UDP traffic. If there are multiple network functions in the path, then the policy rule may be composed on the edge. For example, if GCSBlock1 and GCSBlock5 have policies to deny UDP and HTTP traffic from ANY source, then the edge may be labeled "[UDP:80, HTTP:443]".

Figure 10:
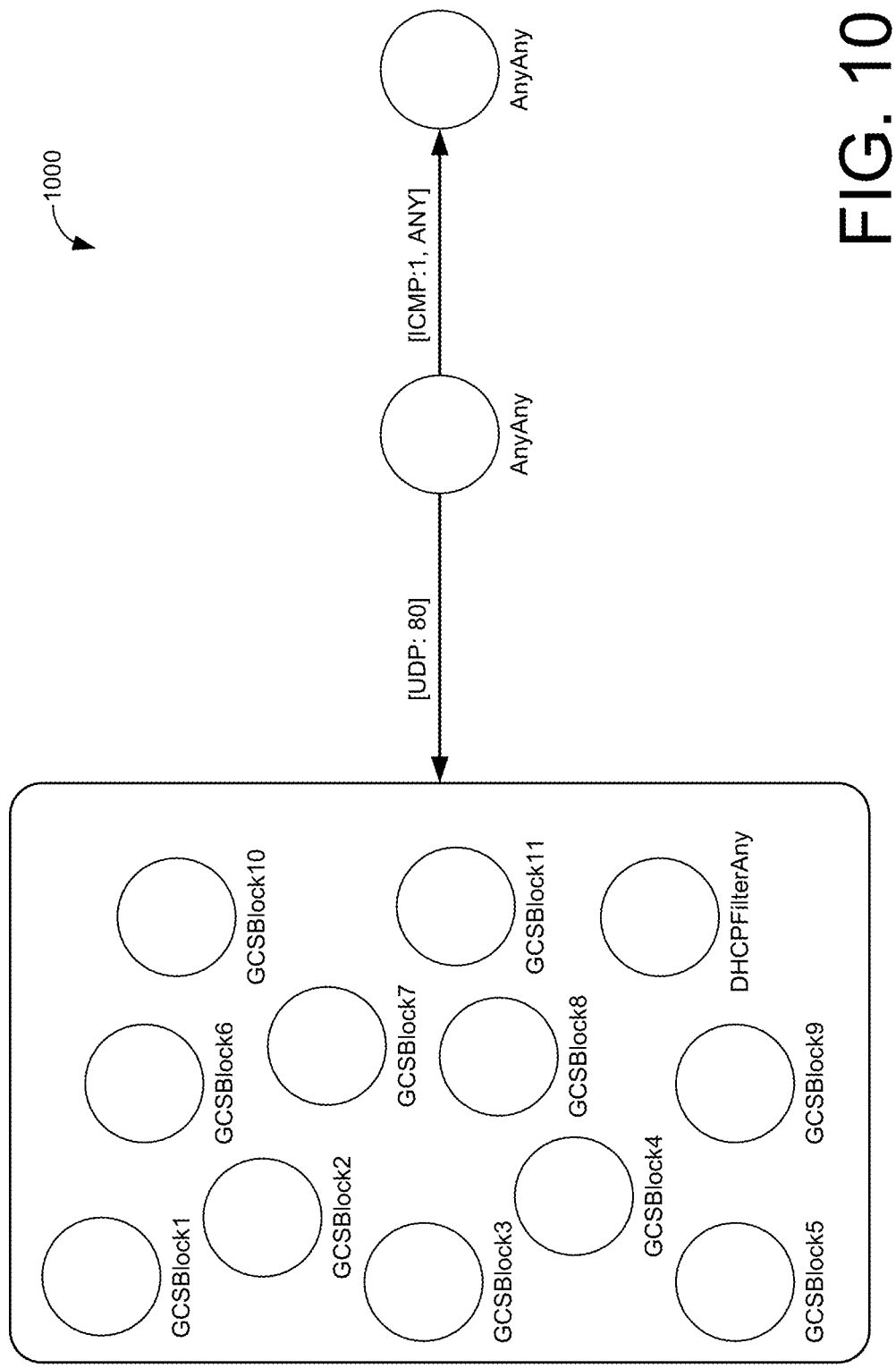
FIG. 10 illustrates a policy grouping according to a gray-list model for the example composed graph of FIG. 8.

Hardware processor 302 may execute instruction 326 to perform displaying the composed graph representation of the one or more policies to the user. FIG. 8 illustrates a composed graph representation 800 of the access control list, for example GCS-Block, which is label given to an end-point or an end-point group of network devices or devices connected to the network. Referring to FIG. 8, in the graphical representation 800, each access control list entry is shown, with the policy AnyAny shown as input to each entry. Also shown for each entry is a specification of a communication protocol, and a port number (in this example universal datagram protocol (UDP) and port number 80). FIG. 9 shows a white-list model such that the only the policies that are shown are "deny." Alternatively the tool may show a black-list model where the only policies shown are "allowed." In another example, illustrated in FIG. 10, the tool may show a gray-list model 1000 which shows both "allow" and "deny" policies.

Hardware processor 302 may execute instruction 328 to perform receiving input from the user. Hardware processor 302 may execute instruction 330 to perform modifying the composed graph representation according to the input from the user, either via the tool user interface or device configuration command line interface. The tool may be in sync with the policy configuration of any network device at any point in time. In order to ensure the graph-based representation is reversible with the policies in the configuration, any new policy added may be updated in the representation, and in the configuration file. That is, a user may add, delete, and modify switch policies by manipulating one or more of the graphical representations of those policies. For example, the user may resolve an access control policy conflict by manipulating the composed graph representation, such as the representation 800 of FIG. 8. Manipulation of the composed graph representation may include adding a new combined policy in the graph itself. For example, if in FIG. 8 a user may want to add a new network function between 'GCSBlock1' and 'AnyAny', such as deny http traffic on port 443. The user may manipulate the graph to add a new edge with both functions on it such as '[UDP:80, HTTP:443]'. This action result in a new input policy graph, such as the input graph 600 of FIG. 6, which is then converted to the command line interface (CLI) config 'deny http any 16.93.240.248'. Similarly if a new policy is added from the CLI, a new input policy is created, and the graph representation is updated. A similar process takes place when an edit to the current policy or current policy graph representation occurs. The graph representation not only provides a platform to view thousands of policies with ease, but also provides an interface to add, modify, and edit policies on-the-fly.

Hardware processor 302 may execute instruction 332 to perform modifying the configurations for the network devices based on at least one of the user input and the modified composed graph representation. For example, the composed graph representation 800 of FIG. 8, as modified by the user, may be used to delete, modify, or replace the access control lists of the configuration 400 of FIG. 4. Hardware processor 302 may execute instruction 334 to perform installing the modified configuration in the network switch. For example, the configuration 400 of FIG. 4 may be modified as described above, and installed into the network switch 108 of FIG. 1.

Figure 11:
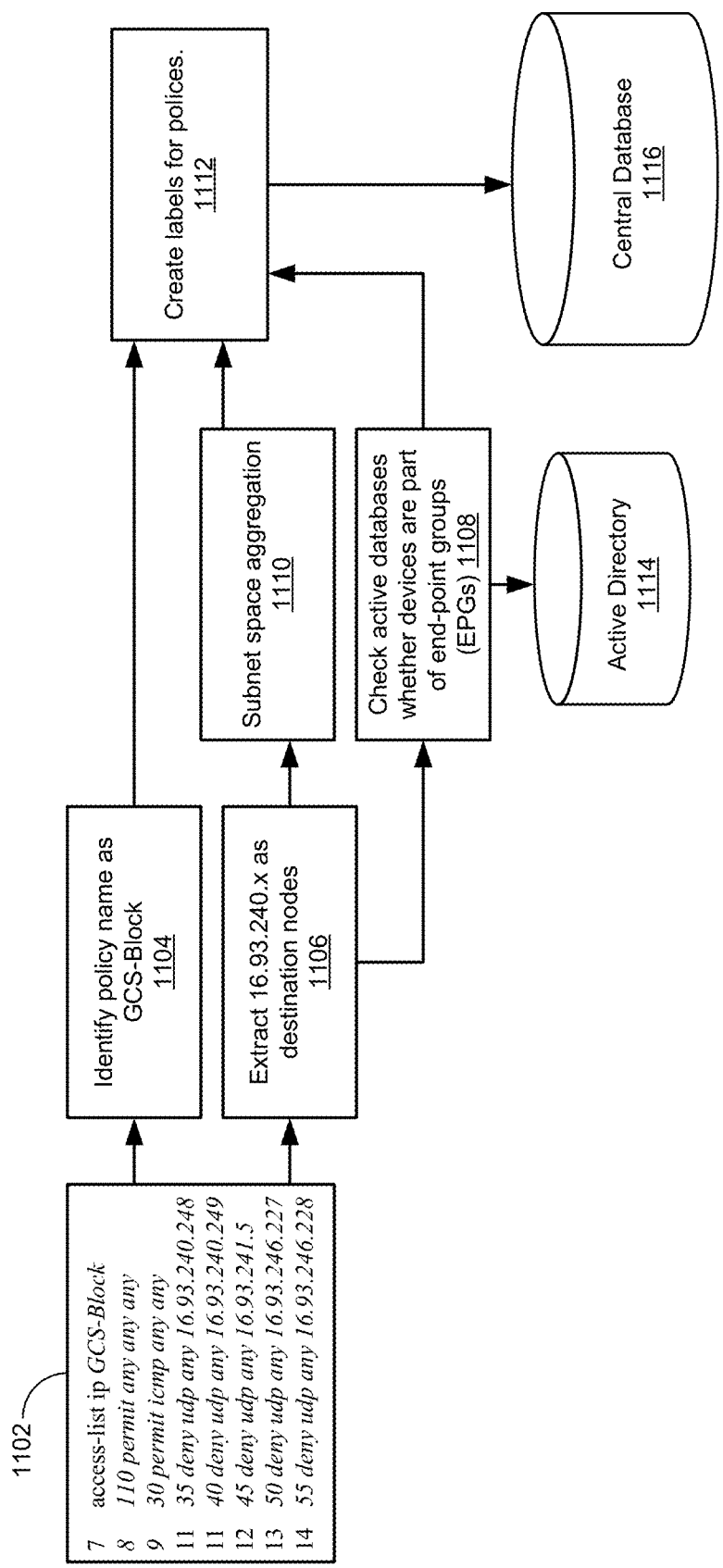
FIG. 11 illustrates a label formulation process for the disclosed tool according to embodiments of the disclosed technology.

FIG. 11 illustrates a label formulation process for the disclosed tool according to embodiments of the disclosed technology. The process begins with a configuration 1102. The tool scans the configuration 1102 for the name of a policy, at 1104. The policy name "GCS-Block" is identified as the name of the policy. The devices that form the endpoint groups (EPGs) are extracted from the configuration 1102, at 1106. In particular, the IP addresses 16.93.240.x are extracted as destination nodes. The devices are checked against the active directory 1114 to determine whether labels already exist for those devices, at 1108. If no labels are found, subnet space aggregation may be used, as described above, at 1110. If subnet space aggregation fails, policy-based labeling may be used, as described above. Labels for the policies are created, at 1112. The policy labels are stored in a central database 1160.

FIG. 14 depicts a block diagram of an example computer system 1400 in which embodiments described herein may be implemented. The computer system 1400 includes a bus 1402 or other communication mechanism for communicating information, one or more hardware processors 1404 coupled with bus 1402 for processing information. Hardware processor(s) 1404 may be, for example, one or more general purpose microprocessors.

The computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

The computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

The computer system 1400 may be coupled via bus 1402 to a display 1412, such as a liquid crystal display (LCD) (or touch screen), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. In some embodiments, the same direction information and command selections as cursor control may be implemented via receiving touches on a touch screen without a cursor.

The computing system 1400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C, C++, Go or Python. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1402. Transmission media can also take the form of acoustic or light waves, such as those generated during radio-wave and infra-red data communications.

The computer system 1400 also includes a communication interface 1418 coupled to bus 1402. Network interface 1418 provides a two-way data communication coupling to one or more network links that are connected to one or more local networks. For example, communication interface 1418 may be an integrated services digital network (ISDN) card, cable modem, satellite modem, or a modem to provide a data communication connection to a corresponding type of telephone line. As another example, network interface 1418 may be a local area network (LAN) card to provide a data communication connection to a compatible LAN (or WAN component to communicated with a WAN). Wireless links may also be implemented. In any such implementation, network interface 1418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1418, which carry the digital data to and from computer system 1400, are example forms of transmission media.

The computer system 1400 can send messages and receive data, including program code, through the network (s), network link and communication interface 1418. In the Internet example, a server might transmit a requested code for an application program through the Internet, the ISP, the local network and the communication interface 1418.

The received code may be executed by processor 1404 as it is received, and/or stored in storage device 1410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
    a hardware processor; and
    a non-transitory machine-readable storage medium encoded with instructions executable by the hardware processor to perform a method comprising:
        receiving configurations for a plurality of network devices;
        detecting a model type for each configuration;
        responsive to the model type being a denylist model, converting the configuration to an allowlist model prior to extracting one or more policies from the configuration and extracting a label hierarchy from the configuration;
        extracting the one or more policies from the configurations, comprising identifying names of the policies;
        extracting the label hierarchy from the configurations according to the names of the policies, the label hierarchy describing an organization of nodes in a network comprising the network devices;
        generating a connectivity of a network comprising the network devices based on the one or more policies and the label hierarchy;
        generating a policy graph representation of the connectivity of the network; and
        displaying the policy graph representation of the connectivity to a user.

2. The system of claim 1, the method further comprising:
    generating a composed graph representation of the one or more policies; and
    displaying the composed graph representation of the one or more policies to the user.

3. The system of claim 2, the method further comprising:
    receiving input from the user to modify the policies; and
    modifying the composed graph representation, and the policy graph representation, according to the input from the user.

4. The system of claim 3, the method further comprising:
modifying the configurations for the network devices based on at least one of the user input and the modified composed graph representation.

5. The system of claim 4, the method further comprising:
installing the modified configurations in the network devices.

6. The system of claim 1, the method further comprising:
extracting an intent from one of the policies;
generating one or more input graphs according to the intent; and
displaying the one or more input graphs to the user.

7. A non-transitory machine-readable storage medium encoded with instructions executable by a hardware processor of a computing component, the machine-readable storage medium comprising instructions to cause the hardware processor to perform a method comprising:
receiving configurations for a plurality of network devices;
detecting a model type for each configuration;
responsive to the model type being a denylist model, converting the configuration to an allowlist model prior to extracting one or more policies from the configuration and extracting a label hierarchy from the configuration;
extracting the one or more policies from the configurations, comprising identifying names of the policies;
extracting the label hierarchy from the configurations according to the names of the policies, the label hierarchy describing an organization of nodes in a network comprising the network devices;
generating a connectivity of a network comprising the network devices based on the one or more policies and the label hierarchy;
generating a policy graph representation of the connectivity of the network; and
displaying the policy graph representation of the connectivity to a user.

8. The medium of claim 7, the method further comprising:
generating a composed graph representation of the one or more policies; and
displaying the composed graph representation of the one or more policies to the user.

9. The medium of claim 8, the method further comprising:
receiving input from the user to modify the policies; and
modifying the composed graph representation, and the policy graph representation, according to the input from the user.

10. The medium of claim 9, the method further comprising:
modifying the configurations for the network devices based on at least one of the user input and the modified composed graph representation.

11. The medium of claim 10, the method further comprising:
installing the modified configurations in the network devices.

12. The medium of claim 7, the method further comprising:
extracting an intent from one of the policies;
generating one or more input graphs according to the intent; and
displaying the one or more input graphs to the user.

13. A method comprising:
receiving configurations for a plurality of network devices;
detecting a model type for each configuration;
responsive to the model type being a denylist model, converting the configuration to an allowlist model prior to extracting one or more policies from the configuration and extracting a label hierarchy from the configuration;
extracting one or more policies from the configuration, comprising identifying names of the policies;
extracting a label hierarchy from the configurations according to the names of the policies, the label hierarchy describing an organization of nodes in a network comprising the network devices;
generating a connectivity of a network comprising the network devices based on the one or more policies and the label hierarchy;
generating a policy graph representation of the connectivity of the network; and
displaying the policy graph representation of the connectivity to a user.

14. The method of claim 13, further comprising:
generating a composed graph representation of the one or more policies; and
displaying the composed graph representation of the one or more policies to the user.

15. The method of claim 14, further comprising:
receiving input from the user to modify the policies; and
modifying the composed graph representation, and the policy graph representation, according to the input from the user.

16. The method of claim 15, further comprising:
modifying the configurations for the network devices based on at least one of the user input and the modified composed graph representation.

17. The method of claim 16, further comprising:
installing the modified configurations in the network devices.

18. The method of claim 13, further comprising:
extracting an intent from one of the policies;
generating one or more input graphs according to the intent; and
displaying the one or more input graphs to the user.

* * * * *